United States Patent
Lee

(10) Patent No.: US 9,369,657 B2
(45) Date of Patent: Jun. 14, 2016

(54) METHOD AND DEVICE FOR IMPROVED MENU SEARCH AND SELECTION

(75) Inventor: Jin Seok Lee, Jeollanam-do (KR)

(73) Assignee: LG ELECTRONICS INC., Seoul (KR)

(*) Notice: Subject to any disclaimer, the term of this patent is extended or adjusted under 35 U.S.C. 154(b) by 1285 days.

(21) Appl. No.: 13/020,655

(22) Filed: Feb. 3, 2011

(65) Prior Publication Data
US 2011/0126157 A1    May 26, 2011

(30) Foreign Application Priority Data
Apr. 6, 2004    (KR) .................. 10-2004-0023248

(51) Int. Cl.
| G06F 3/0481 | (2013.01) |
| G06F 3/0482 | (2013.01) |
| G06F 3/0483 | (2013.01) |
| G06F 3/0489 | (2013.01) |
| H04N 5/445  | (2011.01) |
| H04N 21/431 | (2011.01) |
| H04N 5/44   | (2011.01) |
| H04N 21/485 | (2011.01) |

(52) U.S. Cl.
CPC .......... *H04N 5/44543* (2013.01); *G06F 3/0482* (2013.01); *H04N 5/44513* (2013.01); *H04N 21/4312* (2013.01); *H04N 5/4401* (2013.01); *H04N 21/485* (2013.01)

(58) Field of Classification Search
CPC ... G06F 3/0482; G06F 3/0481; G06F 9/4443; G06F 3/0489; H04N 5/44543
USPC .......................................... 715/810, 764, 825
See application file for complete search history.

(56) References Cited

U.S. PATENT DOCUMENTS

| 4,823,283 | A  |   | 4/1989  | Diehm et al.         |
| 5,485,197 | A  |   | 1/1996  | Hoarty               |
| 5,627,531 | A  | * | 5/1997  | Posso et al. .......... 341/22 |
| 5,798,760 | A  |   | 8/1998  | Vayda et al.         |
| 6,028,600 | A  |   | 2/2000  | Rosin et al.         |
| 6,100,889 | A  |   | 8/2000  | Sciammarella et al.  |
| 6,211,921 | B1 | * | 4/2001  | Cherian et al. ........ 348/565 |
| 6,369,717 | B1 | * | 4/2002  | Damiani .......... B60K 35/00 340/815.4 |
| 6,411,337 | B2 |   | 6/2002  | Cove et al.          |
| 6,448,987 | B1 |   | 9/2002  | Easty et al.         |
| 6,538,635 | B1 | * | 3/2003  | Ringot .............. 345/156 |
| 6,583,797 | B1 | * | 6/2003  | Roth ................. 715/810 |
| 6,668,177 | B2 |   | 12/2003 | Salmimaa et al.      |
| 6,753,928 | B1 |   | 6/2004  | Gospel et al.        |
| 6,930,730 | B2 |   | 8/2005  | Maxon et al.         |
| 7,036,091 | B1 |   | 4/2006  | Nguyen               |

(Continued)

FOREIGN PATENT DOCUMENTS

| CN | 1135144 A | 11/1996 |
| CN | 1138384 A | 12/1996 |

(Continued)

*Primary Examiner* — Amy Ng
*Assistant Examiner* — Erik Stitt
(74) *Attorney, Agent, or Firm* — Birch, Stewart, Kolasch & Birch, LLP

(57) ABSTRACT

A method and apparatus for displaying options of a menu in order to easily search and select an option are provided. According to an embodiment, the method includes receiving a menu request from a user, determining a number of menu items associated with the requested menu, and displaying on a menu screen the menu items in a particular display form selected from a plurality of prestored display forms depending on the determined number of menu items.

14 Claims, 12 Drawing Sheets

(56) References Cited

U.S. PATENT DOCUMENTS

| | | | |
|---|---|---|---|
| 7,096,431 B2 | 8/2006 | Tambata et al. | |
| 7,111,788 B2 * | 9/2006 | Reponen | 235/472.01 |
| 7,298,424 B2 | 11/2007 | Oh | |
| 7,418,671 B2 | 8/2008 | Hama et al. | |
| 7,486,335 B2 | 2/2009 | Hsieh | |
| 7,503,014 B2 | 3/2009 | Tojo et al. | |
| 7,587,411 B2 * | 9/2009 | De Vorchik | G06F 17/30235 |
| 7,978,186 B2 | 7/2011 | Vassallo et al. | |
| 2001/0007455 A1 | 7/2001 | Yoo et al. | |
| 2002/0122072 A1 | 9/2002 | Selker | |
| 2002/0171624 A1 | 11/2002 | Stecyk et al. | |
| 2003/0197740 A1 | 10/2003 | Reponen | |
| 2004/0036779 A1 | 2/2004 | Cazier et al. | |
| 2004/0100505 A1 * | 5/2004 | Cazier | 345/811 |
| 2004/0250217 A1 * | 12/2004 | Tojo | G06F 3/0482 715/810 |
| 2005/0081164 A1 * | 4/2005 | Hama et al. | 715/830 |
| 2005/0246624 A1 | 11/2005 | Humpleman et al. | |
| 2006/0085825 A1 | 4/2006 | Istvan et al. | |
| 2006/0129938 A1 | 6/2006 | Humpleman et al. | |

FOREIGN PATENT DOCUMENTS

| | | |
|---|---|---|
| CN | 1138799 A | 12/1996 |
| CN | 1194752 A | 9/1998 |
| CN | 1269116 A | 10/2000 |
| CN | 1430850 A | 7/2003 |
| EP | 1 052 849 A1 | 11/2000 |
| KR | 10-1997-0009277 B1 | 6/1997 |
| KR | 10-2002-0022368 A | 3/2002 |
| KR | 10-2002-0075073 A | 10/2002 |
| KR | 10-2003-0006534 A | 1/2003 |
| WO | WO 00/52587 A1 | 9/2000 |
| WO | WO 02/39712 A2 | 5/2002 |
| WO | WO 03/062976 A1 | 7/2003 |

* cited by examiner

METHOD AND DEVICE FOR IMPROVED MENU SEARCH AND SELECTION

This application is a continuation of application Ser. No. 11/098,486, filed on Apr. 5, 2005, which claims the benefit of the Korean Patent Application No. 10-2004-0023248, filed on Apr. 6, 2004. The entire contents of each of these applications are hereby incorporation by reference.

BACKGROUND OF THE INVENTION

1. Field of the Invention

The present invention relates to a display device, and more particularly, to a display device and a method for displaying a menu in order to effectively search or select various options of the menu.

2. Discussion of the Related Art

Generally, a display device is a device giving a visual representation of broadcasting signals to a viewer. That is, the display device receives the broadcasting signals, processes the received broadcasting signals based on a predetermined method, and displays the processed signals. The display device provides not only images and audios, but also various information to the viewer. Recently, demand for a digital display device has been increasing according to development of multimedia technology.

A digital television includes various functions. For searching and selecting the various functions, a user displays the menu including various options on a screen of the digital television at first. And then, the user searches for or selects a predetermined option from the options of the menu by moving a cursor on the displayed menu. Accordingly, the options of the menu need to be displayed orderly on the screen for selecting the predetermined option. Therefore, it takes a comparatively long time for searching and selecting the predetermined option as the number of options listed in the menu increases.

SUMMARY OF THE INVENTION

Accordingly, the present invention is directed to a display device and a method for displaying a menu that substantially obviate one or more problems due to limitations and disadvantages of the related art.

An object of the present invention is to provide a display device and a method for displaying a menu in order to effectively search and select options (menu items) included in the menu.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for displaying a menu on a display device, the method comprising: receiving a menu request from a user, determining a number of menu items associated with the requested menu, and displaying, on a menu screen, the menu items in a particular display form selected from a plurality of prestored display forms depending on the determined number of menu items.

According to an aspect of the present invention, there is provided a method for displaying a menu on a display device, the method comprising: display, on a menu screen, a plurality of menu items associated with a requested menu, receiving a selection of one of the displayed menu items, and rearranging, on the menu screen, at lest two of the displayed menu items in response to the selection of the menu item.

According to an aspect of the present invention, there is provided a method for displaying a menu on a display device, the method comprising: receiving a menu request, determining a priority of menu items associated with the requested menu, and displaying the menu items on a menu screen according to the determined priority.

According to an aspect of the present invention, there is provided a method of displaying a menu on a display device, the method comprising: receiving a selection of a menu key designated on an input unit associated with the display device, and switching from a current level of menu screen to a previous higher level of menu screen in a menu mode in response to the selection of the menu key.

According to an aspect of the present invention, there is provided a method of displaying a menu on a display device, the method comprising: receiving a selection of a previous channel key designated on an input unit associated with the display device, and exiting out of a current menu screen and a menu mode in response to the selection of the previous channel key.

According to an aspect of the present invention, there is provided a display device for displaying a menu, the display device comprising: an input unit receiving a menu request from a user, a controller determining a number of menu items associated with the requested menu, and a displaying unit displaying, on a menu screen, the menu items in a particular display form selected from a plurality of prestored display forms depending on the determined number of menu items.

According to an aspect of the present invention, there is provided a display device for displaying a menu, the display device comprising: a displaying unit displaying, on a menu screen, a plurality of menu items associated with a requested menu, an input unit receiving a selection of one of the displayed menu items, and a controller controlling the displaying unit and thereby rearranging, on the menu screen, at least two of the displayed menu items in response to the selection of the menu item.

According to an aspect of the present invention, there is provided a display device for displaying a menu, the display device comprising: an input unit receiving a menu request, a controller determining a priority of menu items associated with the requested menu, and a displaying unit displaying the menu items on a menu screen according to the determined priority.

According to an aspect of the present invention, there is provided a display device for displaying a menu, the display device comprising: an input unit including a designated menu key, and a controller controlling a displaying unit to switch from a current level of menu screen to a previous higher level of menu screen in a menu mode in response to the selection of the designated menu key.

According to an aspect of the present invention, there is provided a display device for displaying a menu, the display device comprising: an input unit including a designated previous channel key, and a control controlling a displaying unit to exit out of a current menu screen and a menu mode in response to the selection of the designated previous channel key.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
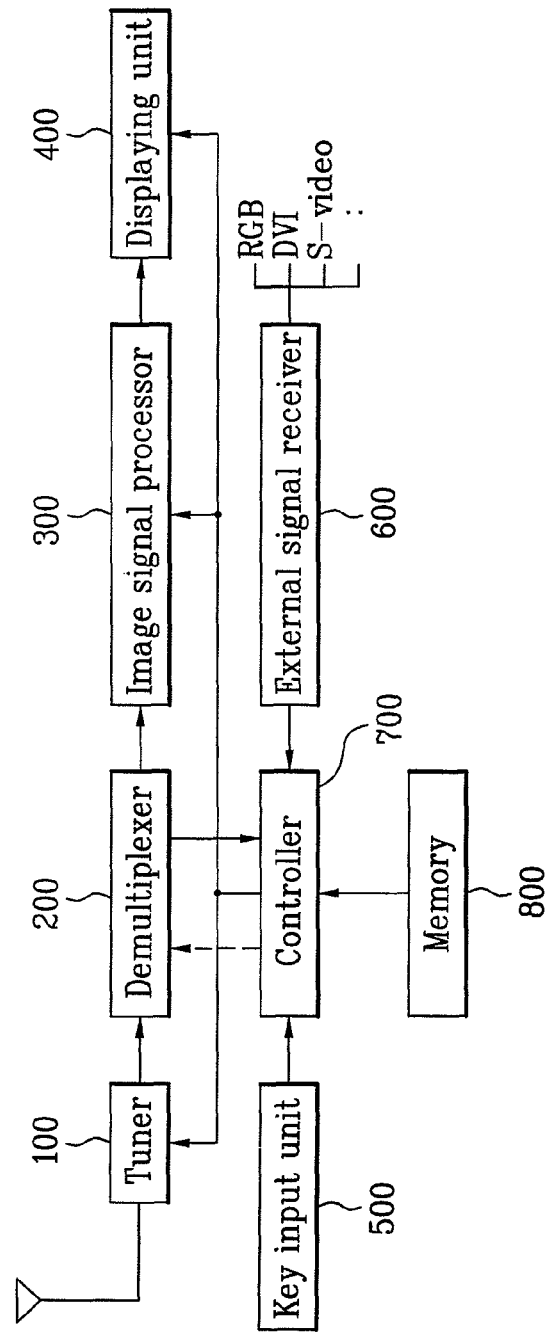
FIG. 1 is a block diagram illustrating a display device in accordance with an embodiment of the present invention.

FIG. 1 is a diagram illustrating a display device in accordance with a preferred embodiment of the present invention. As shown in FIG. 1, the display device includes a tuner 100 for selecting a predetermined broadcasting signal among broadcasting signals received through an antenna; a demultiplexer 200 for dividing the selected broadcasting signal to images, audios and supplementary information; an image signal processor 300 for converting the image signal to a signal to be displayed; a key input unit 500 for receiving input from a user; a controller 700 for displaying a menu in a particular form such as a cross form or a radial form on a displaying unit 400; an external signal receiver 600 for receiving external signals; and a memory 800 for storing the supplementary information and history of using the menu. All the components of the display device are operatively coupled.

According to an embodiment, the controller 700 determines a display type (e.g., form) of the menu according to the number of options to be included in the menu. Also, the controller 700 controls the image signal processor 300 for displaying the menu on the displaying unit 400 according to the determined display type.

The external signal receiver 600 includes a plurality of ports for receiving signals provided from external devices. For example, the external signal receiver 600 includes, but not limited to, a RGB port, a DVI (digital video/visual interactive) port, a component port, a video port and a s-video port, respectively engaging with connectors carrying these external signals.

Hereinafter, embodiments of a method for displaying a menu in accordance with the present invention are explained in detail as follow. These methods can be implemented in the display device of FIG. 1 or other suitable device or system.

Figure 2:
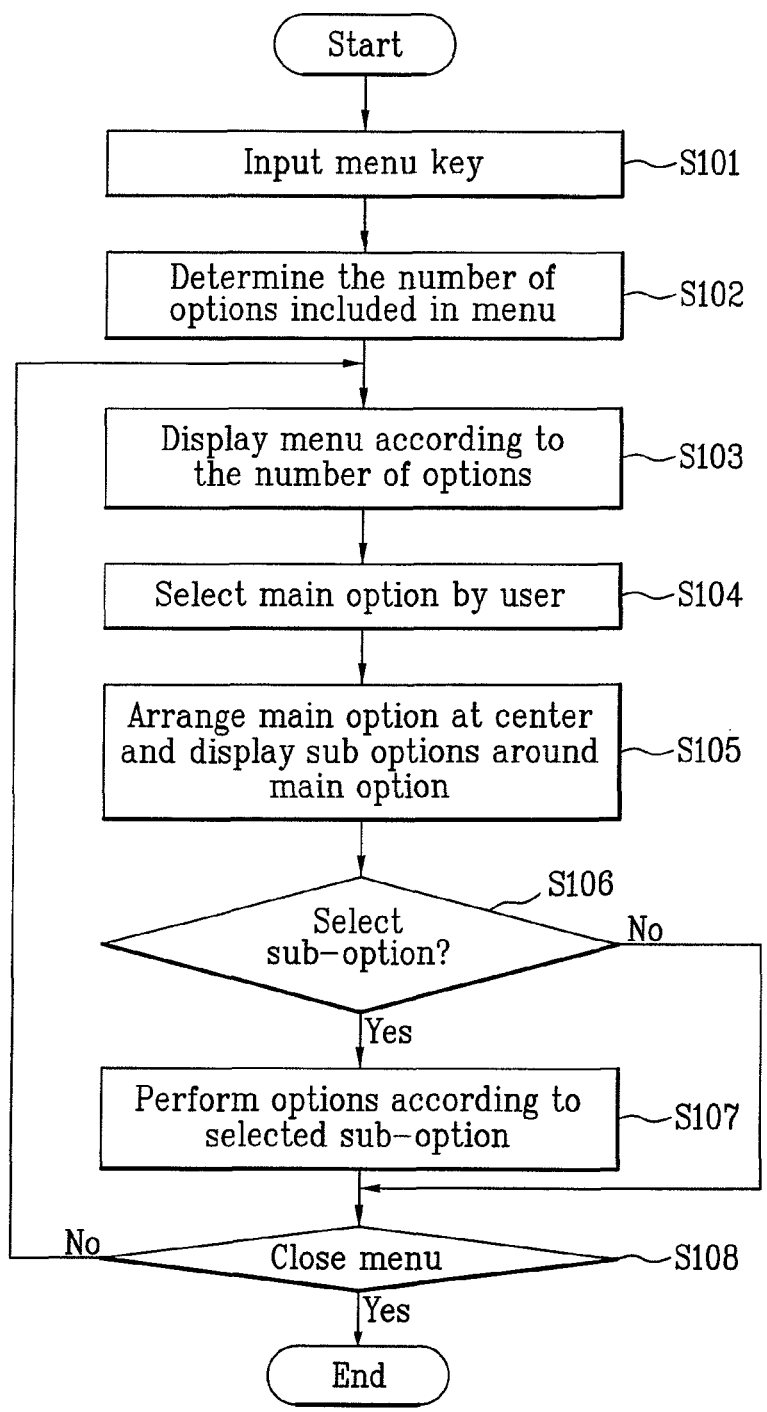
FIG. 2 is a flowchart showing an example of a method for displaying a menu in accordance with an embodiment of the present invention.

FIG. 2 is a flowchart showing a method for displaying a menu in accordance with an embodiment of the present invention. Referring to FIG. 2, when a user inputs a menu key at step S101, the number of options (menu items) associated with the menu is determined at step S102. Step S101 may be implemented by a user pressing on a "menu" key designated on the key input unit such as a remote controller or keypad. Obviously, other ways are also possible.

Figure 3A:
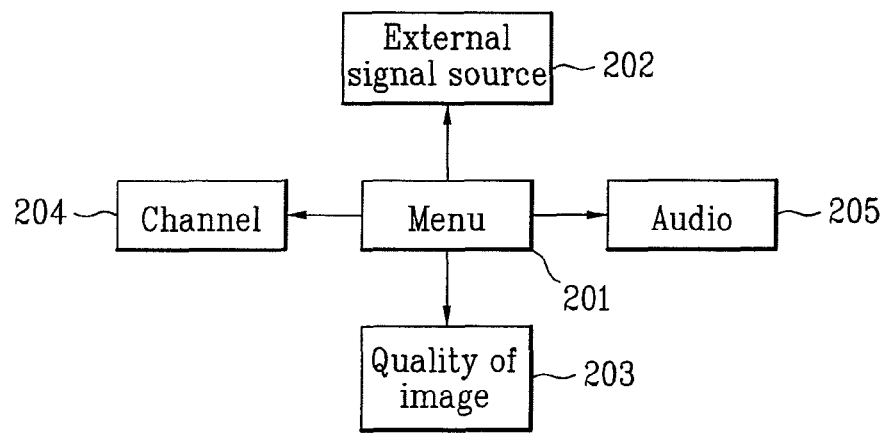
FIGS. 3A and 3B show examples of an OSD menu according to the method of FIG. 2.

Then a display type of the menu is determined according to the determined number of the options and the menu is displayed as an OSD menu in the determined display type on the displaying unit 400 at step S103. FIG. 3A shows an example of a menu as displayed at step S103. In the example of FIG. 3A, step S102 determined that there are 4 main options for the main menu and thus selected to display the main menu in a cross form (i.e., cross shape) with a category indicating item 201 in the center. A different form such as a radial form may be used if there are more than 4 main options.

As shown in FIG. 3A, the main menu as displayed includes the category indicating item 201 and four main options 202-205 for selectively controlling an external signal source, a quality of image, a channel, and an audio. The category indicating item 201 displays "Menu" to indicate to the user that the current image is displaying the options of the main menu.

Figure 3B:
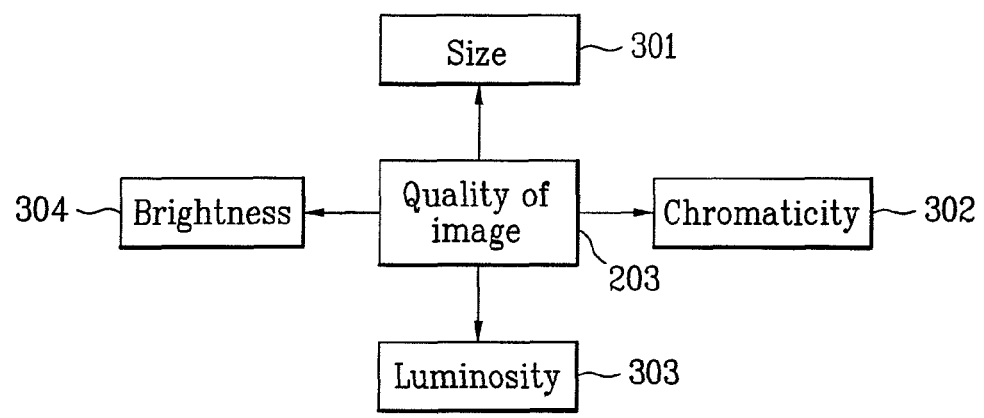

If the user selects a main option such as "Quality of image" 203 at step S104, the selected main option "Quality of image" 203 is moved to a center of the OSD menu as shown in FIG. 3B, and sub-options of the selected main option such as "Size" 301, "Chromaticity" 302, "Luminosity" 303, and "Brightness" 304 are displayed at the top, right, bottom and left in the OSD menu at step S105. That is, now "Quality of image" 203 becomes the category indicating item to indicate to the user that the current image displays the options of "Quality of image". Here, the sub-options may be displayed in the cross form, which was selected at step S103 according to the determined number of main options. In the alternative, the number of sub-options may be determined and displayed in another form according to the determined number of sub-options. In this manner, the display forms may change for each menu display or may be maintained generally in the same form.

If the user selects one of the sub-options at step S106, the controller 700 performs functions corresponding to the selected sub-option at step S107. For example, if the user selects the sub-option "Size" 301, the lower level options of the selected sub-option "Size" may be further displayed. For example, the lower level options "16:9", "4:3", "panorama", "zoom 1" and "zoom 2" may be displayed. Any number of lower option menus may be displayed in this manner. The main options, the sub options and the lower level options each may be displayed in a display type that is most appropriate for the determined number of corresponding options, e.g., in a cross form, a radial form or any other suitable form.

If the user wishes to move up to a higher-level menu, then the category indicating item of the currently displayed menu may be selected for a predetermined time period or for a predetermined number of times by the user. In the example of FIG. 3B, the user may select the "Quality of image" menu item 203 twice to move back to the previous menu screen of FIG. 3A. The selection of any menu item (e.g., 201-205, 301-305) may be made by the user using, e.g., up, down, right and left arrow keys on the key input unit, a joy stick, a stylus pen, etc. In another example, the user may move up to a higher-level menu by selecting the designated "menu" key on the key input unit. These steps for switching between different menu levels are equally applied to other examples and embodiments of the method described below, e.g., to FIGS. 4, 6 and 9.

Once the desired options have been performed at step S107, the menu is closed at step S108. Here, each menu may be displayed for a predetermined time and then automatically closed. In the alternative, each menu may be closed by the user's command. For instance, the user may select a "previous channel" key designated on the key input unit to completely exit out of the OSD menu mode. In fact, it can be configured so that the user can exit out of the OSD menu mode no matter what menu level his is at, by selecting the "previous channel" key. These steps for exiting out of the OSD menu mode completely are equally applicable to other examples and embodiments of the method described below, e.g., to FIGS. 4, 6 and 9.

Accordingly, the menu as displayed according to the present invention is more user-friendly and convenient to use. Further, it takes a shorter time to select menu items since the menu items are displayed in a form most appropriate and effective for the number of menu items to be displayed.

Figure 4:
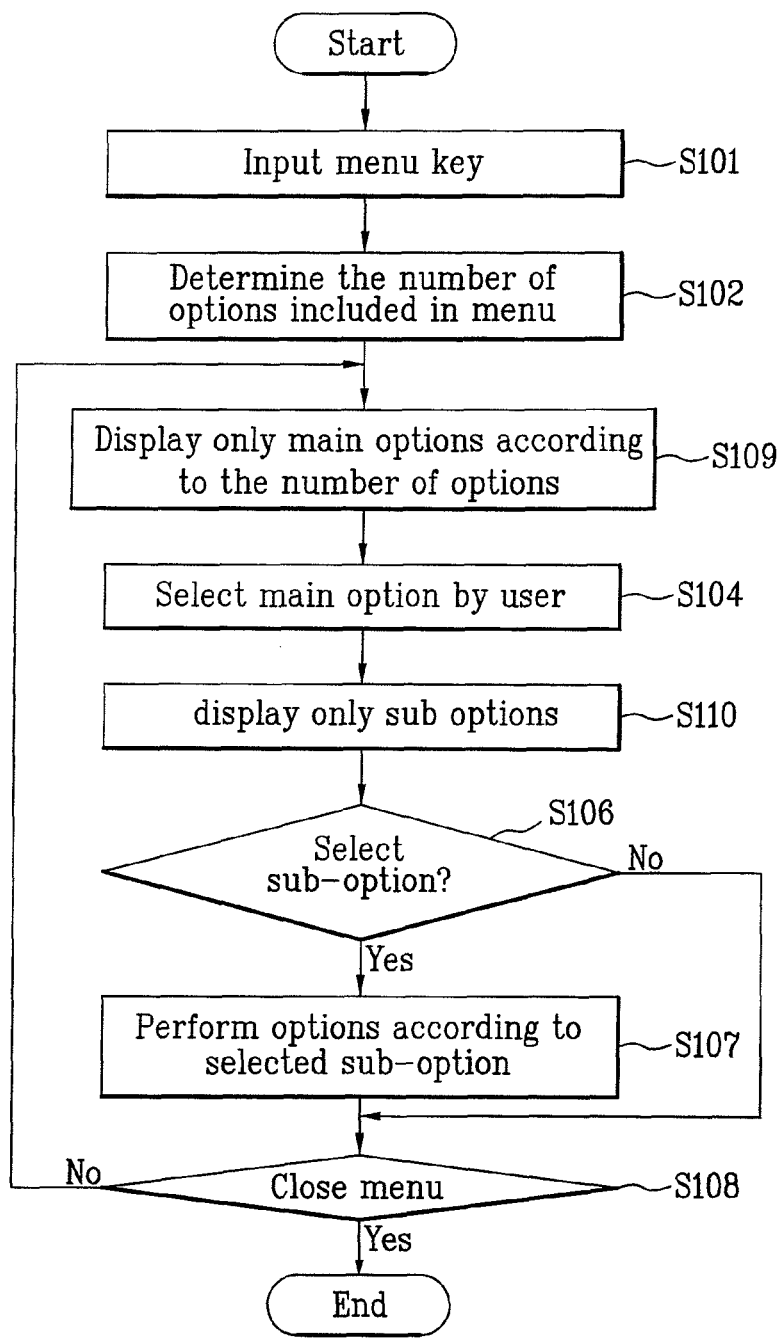
FIG. 4 is a flowchart showing another example of a method for displaying a menu in accordance with an embodiment of the present invention.

FIG. 4 is a flowchart showing another example of a method for displaying a menu in accordance with an embodiment of the present invention. Some steps of FIG. 4 are the same as the steps of FIG. 2 as indicated by the same reference numerals, except for steps S109 and S110 which respectively replace steps S103 and S105 of FIG. 2. As such, the description of the same steps will be omitted.

Figure 5A:
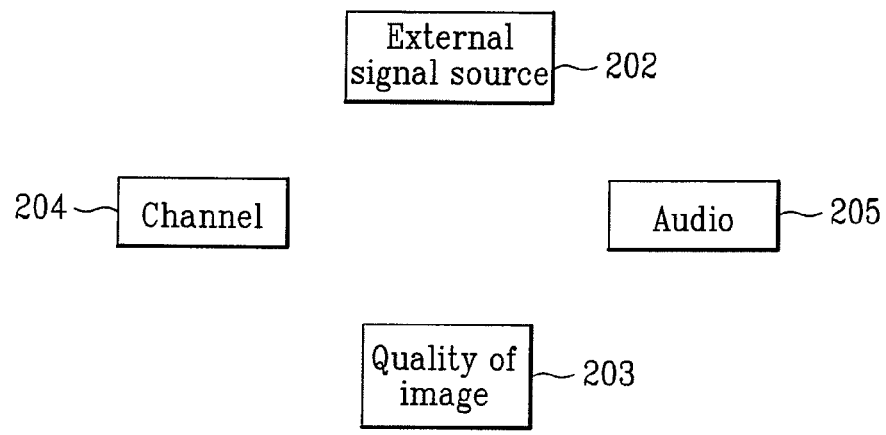
FIG. 5 shows an example of an OSD menu according to the method of FIG. 4.

Referring to FIG. 4, after step S102, a display type of the menu is determined according to the determined number of the options and the menu is displayed as an OSD menu in the determined display type on the displaying unit 400 at step S109. Here, only the options of the menu are displayed in the determined display form without the category indicating item of FIG. 2. FIG. 5A shows an example of such a menu as displayed at step S109, which illustrates the four main options of the main menu as "External signal source", "Audio", "Channel", and "Quality of image".

Figure 5B:
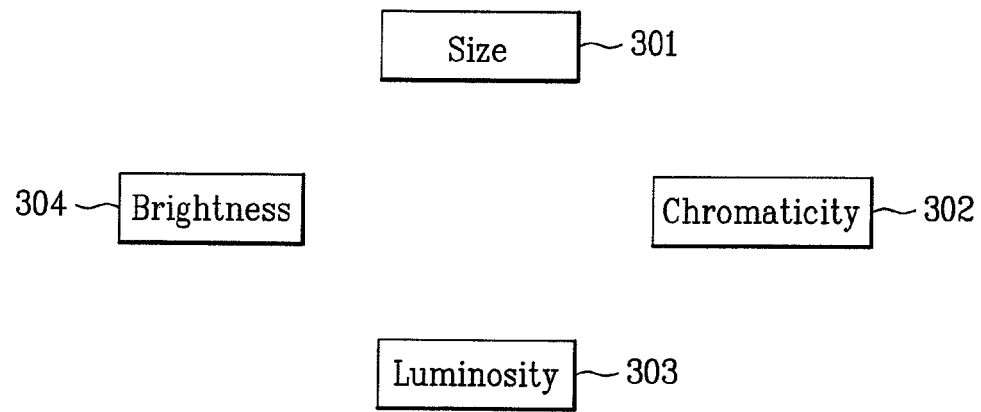

Once the user selects one of these main options, then only the sub-options of the selected main option are arranged and displayed at step S110. FIG. 5B illustrates an example of such a menu, which shows the four sub-options when the main option "Quality of image" is selected from the main menu of FIG. 5A. Similar to the menu of FIG. 5A, there is no category indicating item in this menu.

Figure 6:
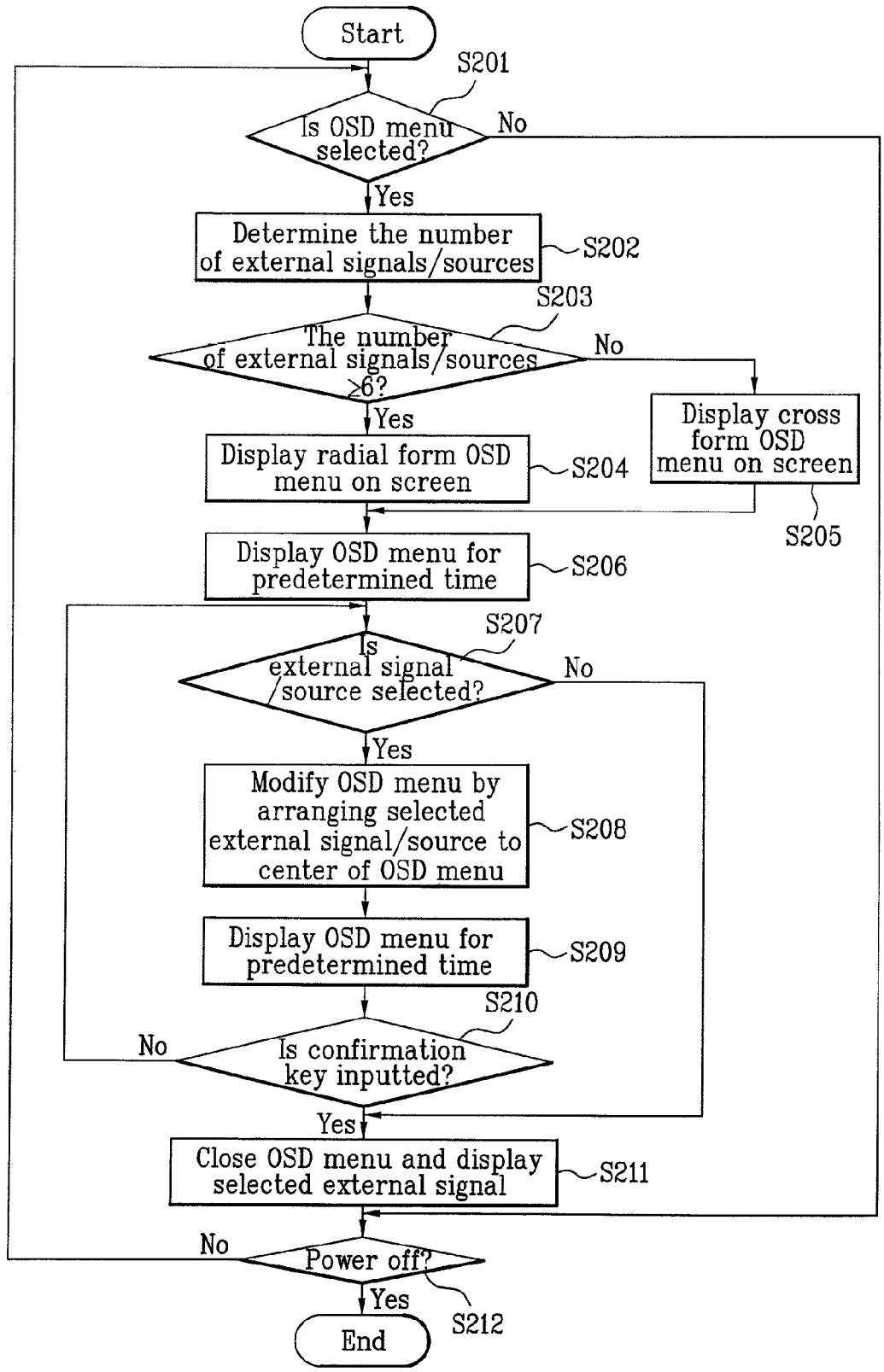
FIG. 6 is a flowchart showing a method for displaying a menu in accordance with an embodiment of the present invention, for the case of displaying external signals/sources.

FIG. 6 is a flowchart showing another example of a method for displaying a menu in accordance with an embodiment of the present invention. As an example only, FIG. 6 involves showing menu(s) associated with "External signal source" option. For example, when a user selects "External signal source" menu item on a menu, e.g., shown in FIG. 3A, then the method of FIG. 6 is applied. The invention, however, is not limited to "External signal source" option, and can be applied to displaying any menu items associated with a particular option/menu.

Referring to FIG. 6, when the user provides a menu request for selecting an external signal source by using the key input unit 500 such as a remote controller or a key panel at step S201, the controller 700 determines the number of external signals/sources for the display device at step S202. In one example, the number of external signals that are currently being input to the external signal receiver 600 is determined, e.g., by checking the signal levels at the external ports of the receiver 600. In another example, the number of external sources (ports) that are currently plugged in at the receiver 600 is determined, e.g., by checking the port connection. Note that an external signal source (e.g., an electric wire from a DVD player) may be plugged in to one of the external ports of the receiver 600, but the port connection does not necessarily mean that it is actually carrying any signal from the external source.

Figure 7A:
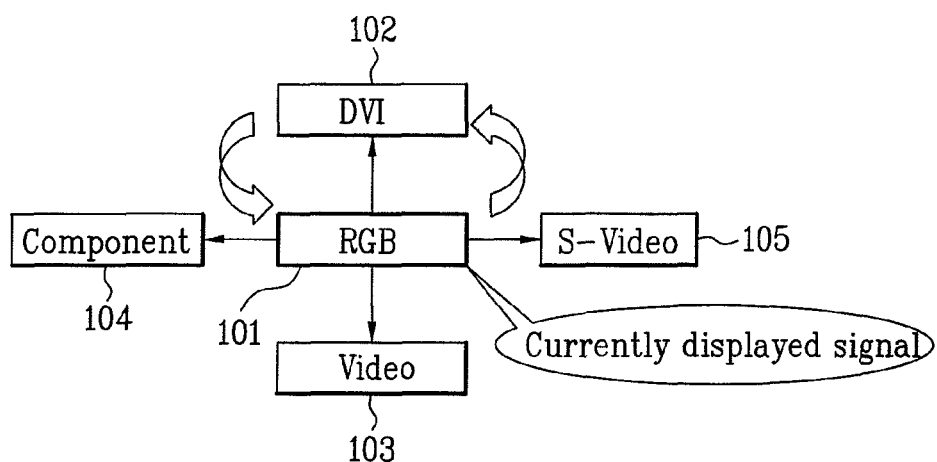
FIGS. 7A and 7B show a cross form of an OSD menu according to the method of FIG. 6.
Figure 7B:
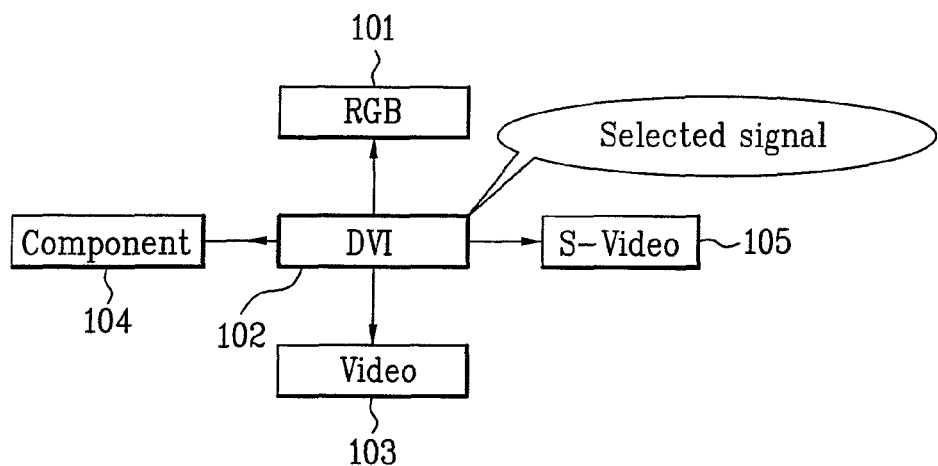
Figure 8A:
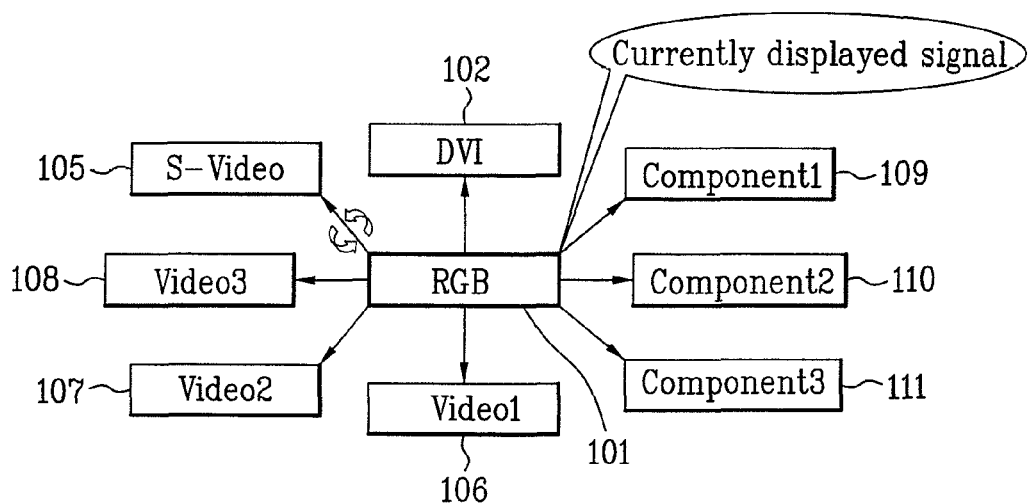
FIGS. 8A and 8B show a radial form of an OSD menu according to the method of FIG. 6.
Figure 8B:
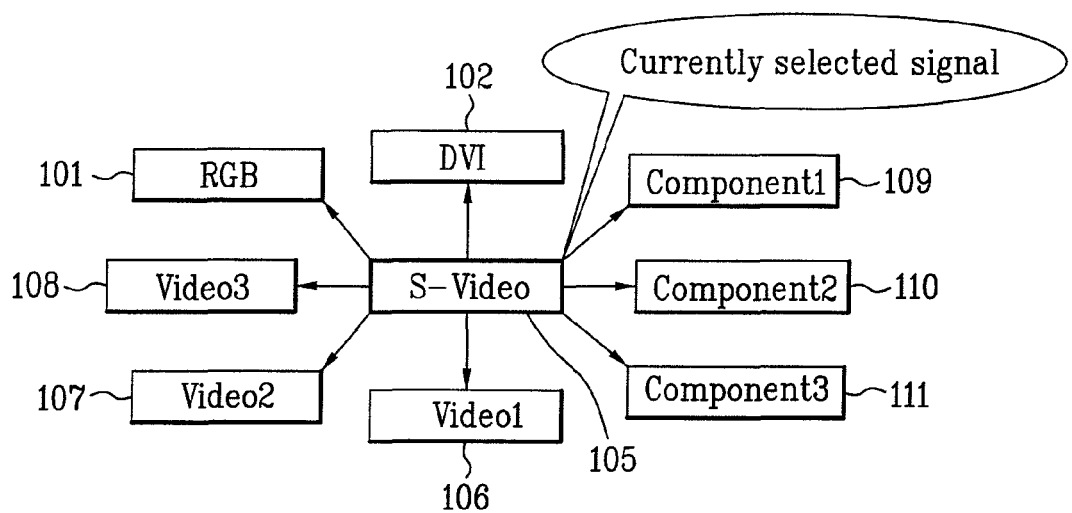

Then the controller 700 determines a display type of the menu according to the determined number of the external signals/sources. For example, if it is determined that the number of external signals/sources is less than six at step S203, the controller 700 displays the OSD menu in a cross form at step S205. If it is determined that the number of external signals/sources is equal to or greater than six, the controller 700 displays the OSD menu in a radial form at step S204. An example of a cross form is shown in FIGS. 7A and 7B, and an example of a radial form is shown in FIGS. 8A and 8B. The controller 700 displays the determined display type of the OSD menu for a predetermined time at step S206. Step S206 can be an optional step.

FIG. 7A is a view showing an example of an OSD menu including five menu options (also referred to herein as menu items), which may be displayed at step S205. As shown in FIG. 7A, five external signals/sources 101-105 to be included in the OSD menu are arranged and displayed in the cross form, and they are as an example "RGB", "DVI", "Video", "Component", and "S-video". That is, the five external signals/sources are arranged at left, right, top, bottom and center of the OSD menu. The center option (101) identifies the external signal currently being displayed on the screen of the displaying unit 400. In the current example, as shown in FIG. 7A, RGB signals are currently being displayed on the screen since the menu item "RGB" 101 is displayed in the center.

If the user selects one of the options by, e.g., using the directional keys of the key input unit 500 at step S207, the selected option is moved to the center of the OSD menu at step S208. For example, when the user selects the menu item "DVI" 102 in FIG. 7A by, e.g., activating an "UP" key of the key input unit 500, the controller 700 switches the location of the menu item "RGB" 101 with the location of the selected menu item "DVI" 102. That is, the menu item "DVI" 102 is now moved to the center of the OSD menu as shown in FIG. 7B to indicate that it is currently selected. In other examples, any location on the menu can be designated to be used to indicate a current selection. Accordingly, the user can quickly and easily identify the status of external signals/sources and the display device. Moreover, the user can easily select menu items since the menu items are displayed in a form most appropriate and effective for displaying according to the number of the menu items.

The menu of FIG. 7B may be displayed for a predetermined time at step S209 (optional step). Thereafter, if the user activates a confirmation key (e.g., 'enter' or 'select' key) at step S210, the controller 700 closes the displayed OSD menu, exits out of the OSD menu mode and displays the selected external signal at step S211. Here, if the method involves determining the number of external sources (ports) currently connected at step S202 and there is no signal currently being input from the selected DVI port, then a user may be informed to select another external source from the menu of FIG. 7B.

If the user inputs a "power-off" command at step S212, the controller stores the modified menu in the memory 800 and terminates the currently running process.

FIG. 8A is a view showing an OSD menu including 9 options being "RGB" 101, "DVI" 102, "Video1" 106, "Video2" 107, "Video3" 108, "S-Video" 105, "Component1" 109, "Component2" 110, and "Component3" 111. As shown in FIG. 8A, nine menu items for selecting an external signal/source are displayed in a radial form on a menu window. This is an example of the menu displayed at step S204. The center menu item is the external signal currently being displayed on the screen. In the example of FIG. 8A, RGB signals are currently being displayed since the menu item "RGB" 101 is the center menu item. If the user selects one of the menu items (options) by, e.g., using one of directional keys of the key input unit 500 or using numeral keys of the key input unit 500 at step S207, the selected option is moved to the center of the OSD menu at step S208. For example, if the user selects the menu item "S-Video" 105 in FIG. 8A by, e.g., activating an "upper left" key or a "1" key in the key input unit 500, the controller 700 switches the location of the selected menu item "S-video" 105 with the location of the menu item "RGB" 101. That is, the option "S-Video" is moved to the center of the OSD menu.

Figure 9:
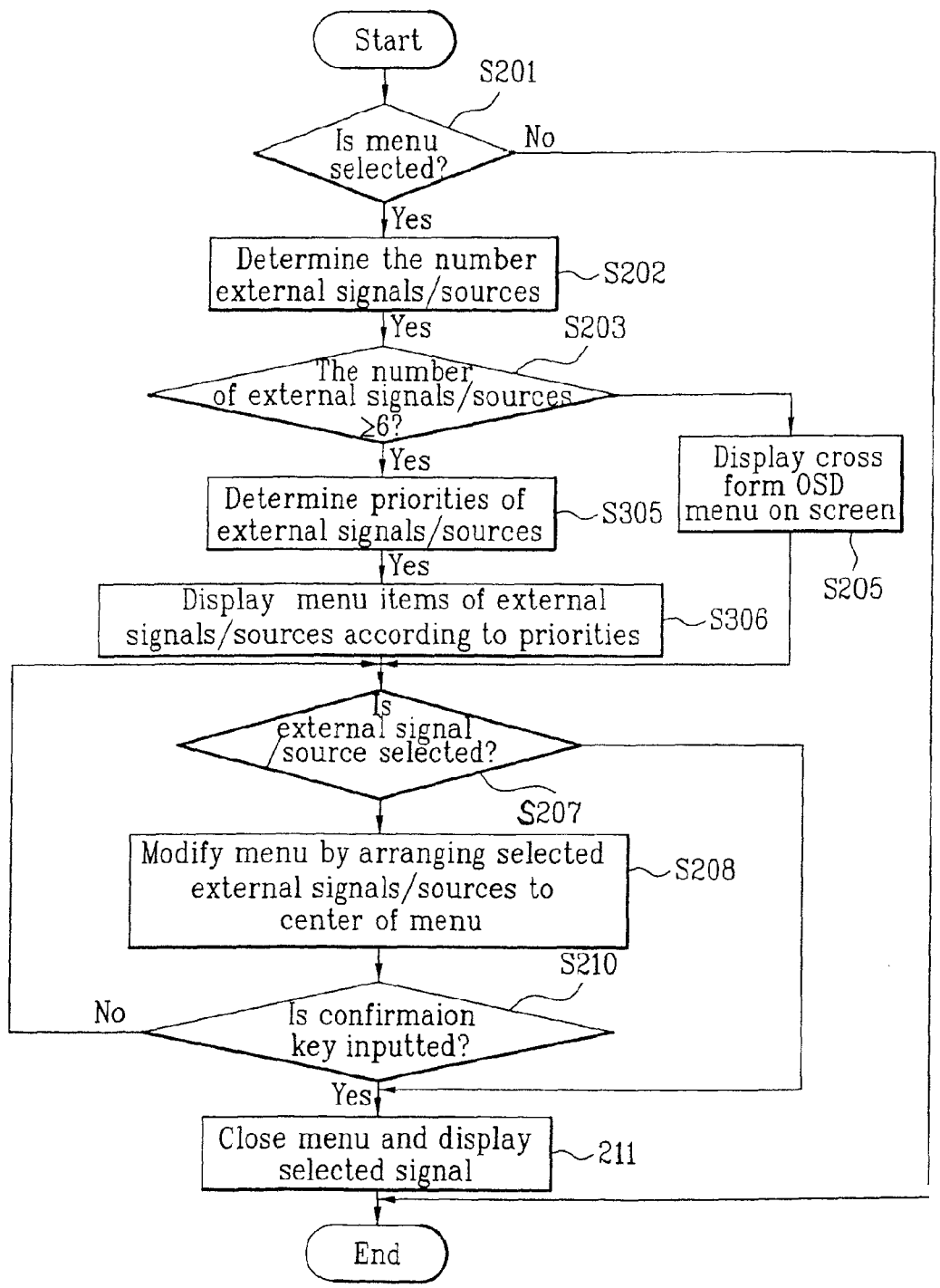
FIG. 9 is a flowchart showing a method for displaying a menu in accordance with an embodiment of the present invention.

FIG. 9 is a flowchart showing another example of a method for displaying a menu in accordance with an embodiment of the present invention. In FIG. 9, if there are a large number of menu options to be displayed in a menu, then the menu options are displayed in a form according to their priority. Some steps of FIG. 9 are the same as the steps of FIG. 6 as indicated by the same reference numerals, except for steps S305 and S306. As such, the description of the same steps will be omitted.

Referring to FIG. 9, if step S203 determines that there exist six or more external signals/sources for the display device, then the controller determines the priority of these external signals/sources at step S305. For example, the controller determines the priority of the external signals/sources according to the history of using the menus stored in the memory 800, e.g., based on the number of selections or a length of display. In such examples, a frequently selected external signal/source would have a higher priority than a seldom selected external signal/source; and an external signal that is displayed for a longer time period would have a higher priority than an external signal that is displayed for a shorter time period. The history of using the menu may also be user-specific. This can be accomplished by identifying each user (e.g., via a user ID and password) before the user has access to the OSD menu and storing each user's history of using the OSD menu separately. This would provide a menu display scheme that is more user-specific.

Figure 10A:
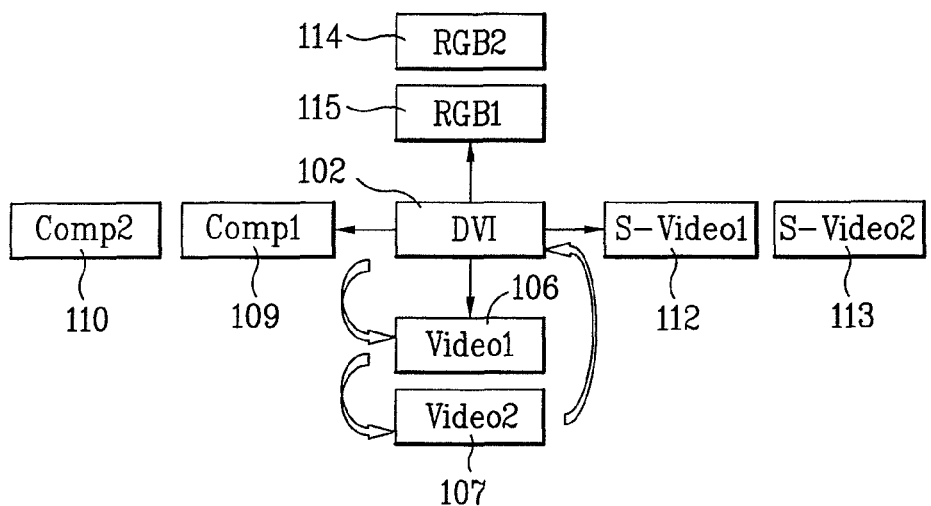
FIGS. 10A and 10B show examples of OSD menu options displayed based on priority according to the method of FIG. 9.

After determining the priority of the external signals/sources, the controller displays the menu items for selecting the external signals/sources in a particular form according to the determined priority at step S306. For example, the external signal/source having the highest priority is displayed at the center of the OSD menu. FIG. 10A is a view showing an example of such an OSD menu displayed at step S306.

As shown in FIG. 10A, there are nine options displayed in this menu and they are "DVI" 102, "Video1" 106, "Video2" 107, "Comp1" 109, "Comp2" 110, "S-Video 1" 112, "S-Video2" 113, "RGB1" 115 and "RGB2" 114. The option having the highest priority (option 102) is displayed at the center of the OSD menu and the options having the next highest priorities (options 109, 112, 115 and 106) are displayed at the left, right, top and bottom on an imaginary inner loop of the OSD menu. The options having the next highest priorities (options 114, 110, 113 and 107) are displayed at an imaginary outer loop of the menu. In other words, if there are numerous external signals/sources, these menu options are arranged at different imaginary loops in the OSD menu according to their priority. By arranging the menu options having the higher priority close to the center of the OSD menu, the user can easily and in a time-saving manner select these menu options, and the overall improved menu displaying and processing scheme is provided by the present invention.

Figure 10B:
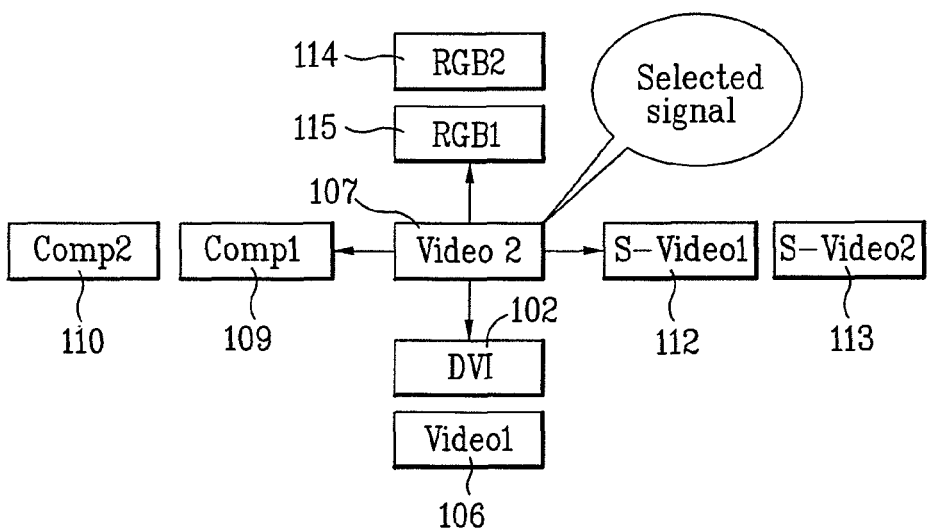

If the user selects one of the menu options by, e.g., using the directional key(s) of the key input unit 500 at step S207 of FIG. 9, the selected menu option is moved to the center of the OSD menu at step S208 and the other menu options are rearranged according to priority. For example, if the user selects the menu item "Video2" 107 in FIG. 10A by activating a "DOWN" key of the key input unit 500 twice, the controller 700 as shown in FIG. 10B moves the selected menu item "Video2" 107 to the center of the menu, and pushes the menu items "DVI" and "Video1" 102 and 106 to lower levels (lower loops). For instance, the menu item "DVI" 102 is lowered to the inner loop position and the menu item "Video1" 106 is lowered to the outer loop position.

Accordingly, the menu items are effectively displayed to the user according to their priority so that the user can easily select the menu items in a time-saving manner. Furthermore, the display of the menu items is automatically updated upon the user's selection of the menu items in a user-specific and time-effective manner.

Figure 11A:
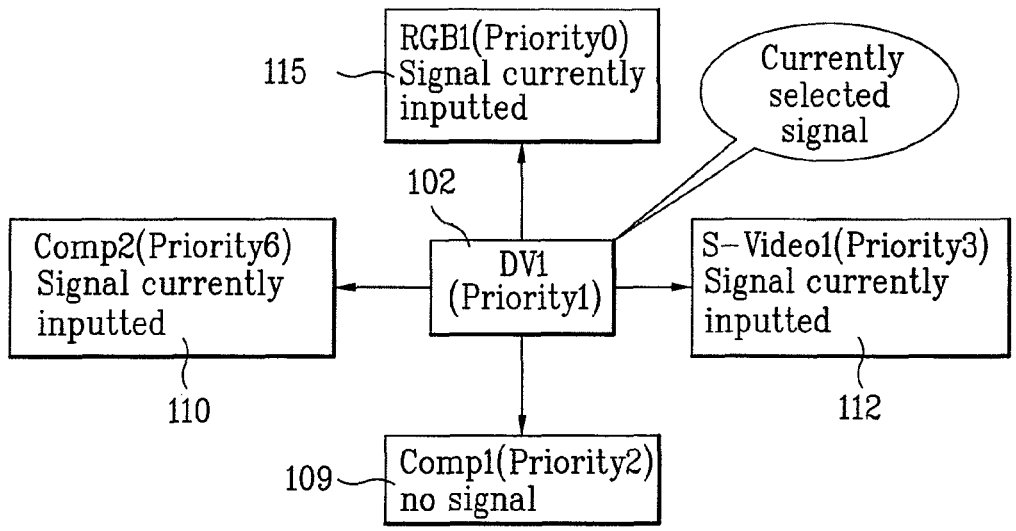
FIGS. 11A to 11C show other examples of an OSD menu including options displayed based on priority according to the method of FIG. 9.
Figure 11B:
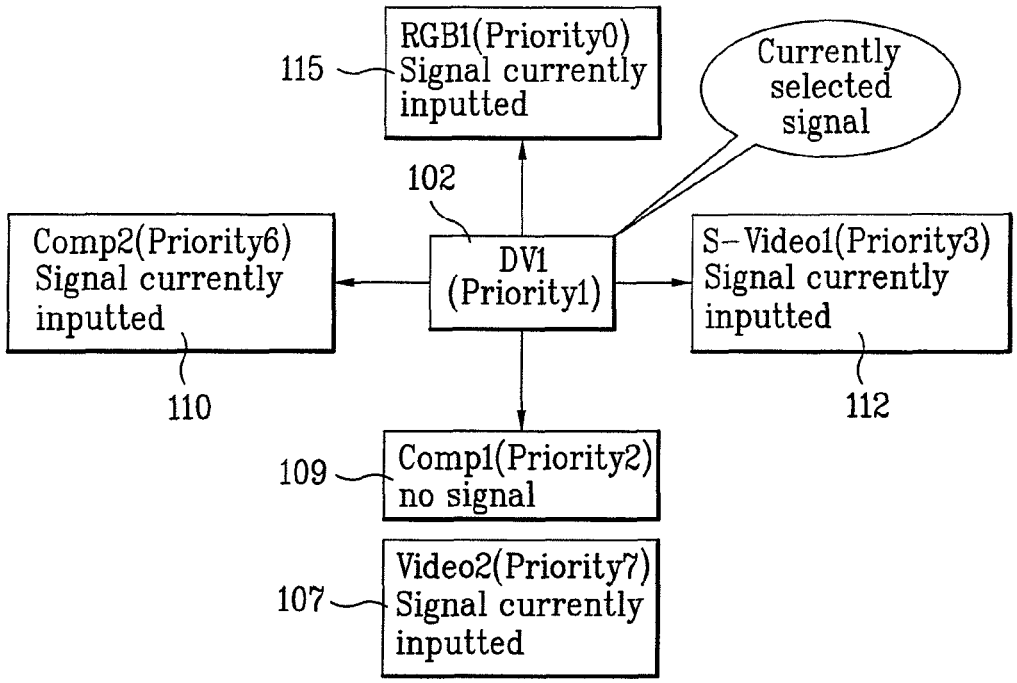
Figure 11C:
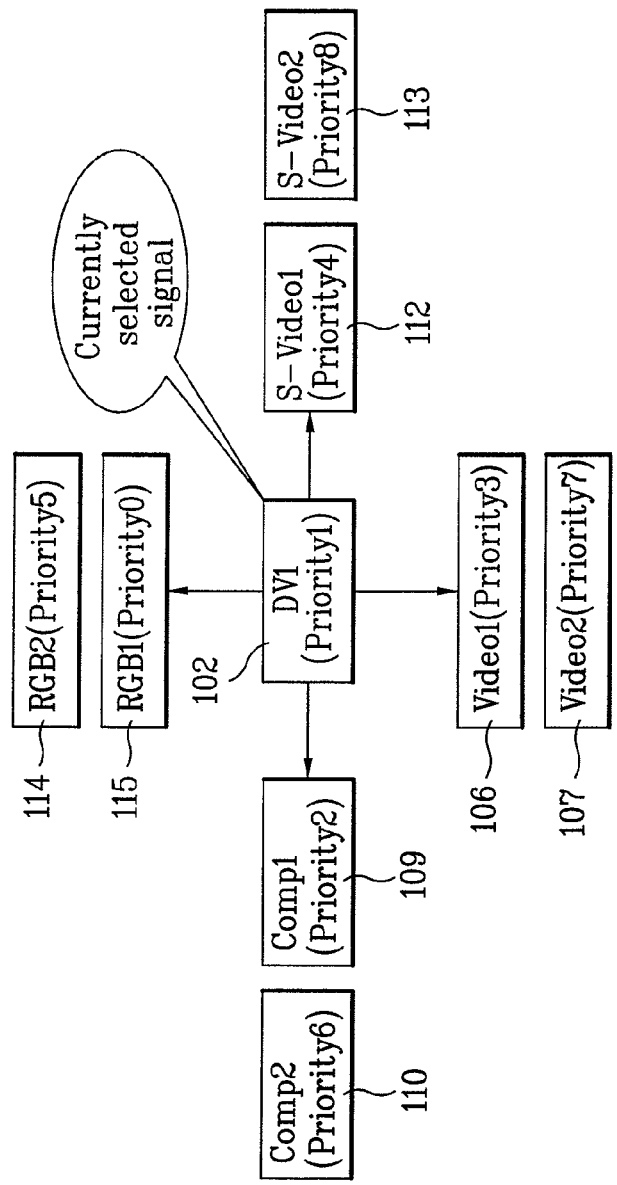

FIGS. 11A to 11C show other examples of an OSD menu according to the method of FIG. 9. As shown in FIG. 11A, an OSD menu including five menu options can be displayed according to their priority with priority information presented therewith. It may also indicate the signal status of each menu option. In FIG. 11A, "RGB1", "Comp2" and "S-Video1" are indicated as signals which are currently being received by the receiver 600; "Comp138 is a signal currently not received by the receiver 600; and "DVI" is indicated as the signal currently selected. Note that although "RGB1" has priority higher than "DVI" as determined at step S305, when the user selects "DVI", it is presented in the center of the menu. As shown in FIG. 11B, another OSD menu including six menu options can be displayed according to their priority with priority information and signal status information presented therewith. As shown in FIG. 11C, another OSD menu including nine menu options can be displayed according to their priority with priority information presented therewith.

In the present invention, the display device can be any device capable of displaying a menu and allowing a user to select a menu item in the menu. For instance, the display device can be a digital TV, an analog TV, a PDA, a computer with a monitor, a mobile terminal (e.g., cell phone) having a screen, etc. Further, in all the embodiments and variations, the user may select the display type (form) for displaying menu(s).

As mentioned above, the present invention displays options to be included in a menu in a particular form (e.g., a cross form, a radial form, etc.) according to the number of options to be included in the menu. Accordingly, the user may easily search and select a particular option and a time spent for searching or selecting the option can be reduced. Also, if there are numerous options included in the menu, priorities are assigned to the options according to the history of using the options and the options are displayed according to the determined priorities. Therefore, frequently used options may be quickly and efficiently searched or selected. Other advantages are provided by the present invention.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for displaying menu items in a display device, the method comprising:
storing priorities on main menu items into a memory;
receiving a request signal for displaying the main menu items; and
displaying, via a display unit, the main menu items in a cross display form when a number of the main menu items is less than a predetermined number and in a radial display form when the number of the main menu items is more than the predetermined number,
wherein the displaying the main menu items in the radial display form comprises displaying a first main menu item at a center portion of the radial display form, a second main menu item at a portion of an inner loop pattern surrounding the center portion, and a third main menu item at a portion of an outer loop pattern surrounding the inner loop pattern, when a priority of the first main menu item is higher than a priority of the second main menu item, and the priority of the second main menu item is higher than a priority of the third main menu item,
wherein a first distance between the center portion and the second main menu item located at the portion of the inner loop pattern surrounding the center portion is different from a second distance between the center portion and the third main menu item located at the portion of the outer loop pattern surrounding the inner loop pattern,
wherein the displaying the main menu items in the cross display form comprises displaying a main menu item with the highest priority at a center portion of the cross display form and other main menu items with lower priorities at portions around the center portion of the cross display form, and
wherein the menu items are dynamically reshaped into the cross display form or the radial display form based on the number of the main menu items being less than the predetermined number, or greater than or equal to the predetermined number, respectively.

2. The method of claim 1, wherein a distance between the first main menu item and the second main menu item is greater than a distance between the second main menu item and the third main menu item based on the priorities on the first, second and third main menu items.

3. The method of claim 1, wherein the priorities are set according to history information of using the main menu items.

4. The method of claim 3, wherein the history information is determined by either frequency information with which the main menu items are selected or period information for which the main menu items are displayed.

5. The method of claim 1, further comprising:
stopping displaying the plurality of main menu items if a predetermined time is elapsed or a specific key input is selected.

6. The method of claim 1, further comprising:
identifying users using the display device; and
displaying the main menu items in the cross or radial display form based on an identified user,
wherein the cross or radial display form of a user is different from the cross or radial display form of another user.

7. The method of claim 1, further comprising:
receiving a selection of one of the displayed main menu items; and
rearranging the main menu items depending on the selected main menu item,
wherein the selected main menu item is moved to a changed position.

8. The method of claim 1, wherein the display device corresponds to a DTV, a PDA, a computer, a mobile terminal or a cellular phone.

9. A method for displaying menu items in a display device, the method comprising:
storing priorities on main menu items on a memory;
receiving a request signal for displaying the main menu items; and
displaying the main menu items in a cross display form when a number of the main menu items is less than a predetermined number and in a radial display form when the number of the main menu items is more than the predetermined number,
wherein the displaying the main menu items in the radial display form comprises displaying a first main menu item at a center portion of the radial display form, a second main menu item at a portion of an inner loop pattern surrounding the center portion, and a third main menu item at a portion of an outer loop pattern surrounding the inner loop pattern, when a priority of the first main menu item is higher than a priority of the second main menu item, and the priority of the second main menu item is higher than a priority of the third main menu item, further a first distance between the center portion and the second main menu item located at the portion of the inner loop pattern surrounding the center portion is different from a second distance between the center portion and the third main menu item located at the portion of the outer loop pattern surrounding the inner loop pattern, and
wherein the menu items are dynamically reshaped into the cross display form or the radial display form based on the number of the main menu items being less than the predetermined number, or greater than or equal to the predetermined number, respectively.

10. The method of claim 9, wherein the displaying the main menu items further comprises stopping displaying the main menu items if a predetermined time is elapsed or a specific key input is selected.

11. The method of claim 9, further comprising collecting history information of using the main menu items.

12. The method of claim 11, wherein the history information is determined by either frequency information with which the main menu items are selected or period information for which the main menu items are displayed.

13. The method of claim 9, further comprising:
identifying users using the display device; and
displaying the main menu items in the cross or radial display form based on an identified user,
wherein the cross or radial display form of a user is different from the cross or radial display form of another user.

14. The method of claim 9, wherein the display device corresponds to a DTV, a PDA, a computer, a mobile terminal or a cellular phone.

* * * * *